3,196,114
DIFLUOROMETHYLENE RADICALS TRAPPED
IN A MATRIX OF SOLIDIFIED GAS
Sebastian V. R. Mastrangelo, Wilmington, Del., assignor to E. I. du Pont de Nemours and Company, Wilmington, Del., a corporation of Delaware
Filed Feb. 9, 1961, Ser. No. 88,056
2 Claims. (Cl. 252—182)

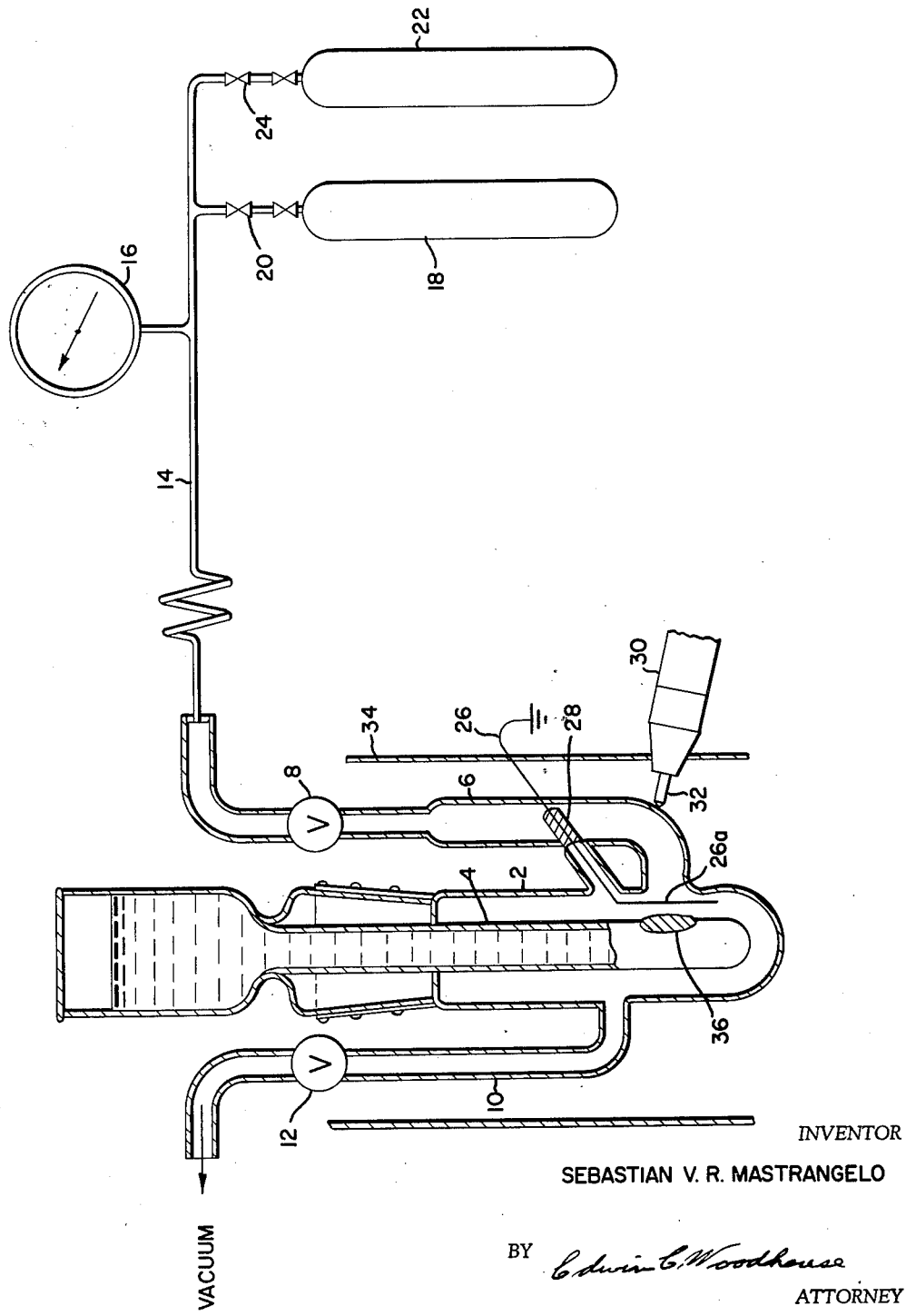

This invention relates to a process for preparing difluoromethylene radicals trapped in a matrix of a solidified gas, to the products of such process, and to a process for reacting the trapped difluoromethylene radicals with desired reactant materials.

It is well known that free radicals of any sort are highly reactive and highly unstable entities. Considerable attention has been devoted of late to the problem of isolating free radicals under such conditions that their physical and chemical properties can be studied and their reactions controlled. The most serious difficulty to the solution of such problem has been the isolation of the free radicals in sufficient quantity to be useful in preparative chemical reactions and syntheses. The existence of the difluoromethylene free radical ($CF_2$) is well established. It has been postulated as a reaction intermediate in several reactions. Although the ultraviolet adsorption spectrum of difluoromethylene radicals has been observed and characterized at high temperatures, the isolation of the free radical has never been accomplished prior to this invention. Also, although it is well known that radio frequency electric discharges will form free radicals in many cases, such discharges have not been applied heretofore to fluorocarbons. Since isolated difluoromethylene radicals would be useful intermediates for the preparation of a wide variety of useful chemical compounds, it is desirable to provide a process for preparing and isolating difluoromethylene radicals in a stable and useful form.

It is an object of this invention to provide difluoromethylene radicals trapped in a solid matrix in a stable and useful form. Another object is to provide a process for preparing and isolating difluoromethylene radicals in a stable and useful form. A particular object is to provide a process for preparing and isolating difluoromethylene radicals trapped in a solidified gas under such conditions that their physical and chemical properties can be studied and their reactions controlled. A further object is to provide a process for the controlled reaction of trapped difluoromethylene radicals to provide a variety of useful products. Other objects are to provide new compositions of matter and to advance the art. Still other objects will appear hereinafter.

The above and other objects of this invention may be accomplished by subjecting perfluorocyclobutane or mixtures thereof with other inert gases which have melting points above 95° K. to a concentrated radio frequency electric disadvantage and then condensing the reaction mixture on a condensing surface which is maintained at a temperature below 95° K. The radio frequency electric discharge converts some of the perfluorocyclobutane to free difluoromethylene radicals, and the undecomposed perfluorocyclobutane and other gases condense on the condensing surface as a solid matrix containing trapped difluoromethylene radicals. The resulting composition, consisting essentially of the difluoromethylene radicals trapped in the solid matrix at a temperature below 95° K., is a novel and useful composition and forms a part of this invention. A further feature of this invention comprises the process of reacting the trapped difluoromethylene radicals by treatnig the deposit (of solid matrix and trapped difluoromethylene radicals) with an excess of a reactant material which has a boiling point below 21° C. at 10 mm. of mercury, and then causing the temperature of the condensing surface and of the materials condensed thereon to rise to a temperature of at least 95° K., whereby the difluoromethylene radicals react with such reactant material to provide the desired reaction products.

It was surprising and could not be predicted that difluoromethylene radicals would be formed from perfluorocyclobutane under the influence of radio frequency electric discharges. It is well known that perfluorocyclobutane can be decomposed and thereby converted to tetrafluoroethylene and other products (other than difluoromethylene radicals), but the formation of difluoromethylene radicals from perfluorocyclobutane has not been known heretofore. However, by proceeding in accord with the process of this invention, that is, by subjecting gaseous perfluorocyclobutane to a radio frequency electric discharge concentrated near a condensing surface maintained below 95° K., a substantial portion of the perfluorocyclobutane is efficiently converted to difluoromethylene radicals which are effectively trapped in the solidified matrix that is condensed on the condensing surface, provided the application of the radio frequency electric discharge is not continued for materially more than about 15 minutes. Application of the radio frequency electric discharge for materially longer times frequently results in a secondary reaction which leads to trifluoromethyl radicals, the presence of which is indicated by a red color, although the process sometimes has been operated for much longer periods up to about 45 minutes without the development of a red color. The deposit, of trapped difluoromethylene radicals in the solid matrix, has a blue color and is stable so long as it is maintained at a temperature below 95° K. (−178° C.). The isolated trapped difluoromethylene radical has the advantage that other subsequent reactions can be readily controlled. On the other hand, a difluoromethylene radical in the gaseous phase, resulting from a pyrolytic or other type reaction, is highly reactive, generally reacting with any species present.

The difluoromethylene radicals must be trapped in a solid inert matrix, that is, a material which has a melting point above 95° K. and which will not react with the difluoromethylene radicals and will not form other free radicals when subjected to a radio frequency electric discharge. The most convenient matrix is perfluorocyclobutane (M.P. 232.4° K.), since this material is the preferred source of the difluoromethylene radicals. The perfluorocyclobutane may be diluted or mixed, if desired, with one or more other inert matrix forming materials, i.e. inert materials having melting points above 95° K. and boiling points below 21° C. at 10 mm. of mercury. Representative of such other matrix forming materials are xenon (M.P. 161° K.), krypton (M.P. 116° K.), sulfur hexafluoride (M.P.<222° K.), and selenium hexafluoride (M.P. 234° K.). The proportion of such other inert matrix forming materials, which may be used in admixture with the perfluorocyclobutane, is limited solely by economic considerations, as major proportions thereof will tend to decrease the concentration of the trapped difluoromethylene radicals in the deposits.

The trapped difluoromethylene radicals in the solid matrix may be caused to interreact to form tetrafluoroethylene. Also, they may be readily reacted with any other desired reactant material which has a boiling point below 21° C. at 10 mm. of mercury, by merely admitting an excess of such other reactant to the reaction system and then allowing the system to warm up to at least 95° K. The reactions take place rapidly at 95° K. Preferably, the reactant material will be one which has a melting point above 95° K. and hence will condense as a solid over the radical-containing deposit. A "reactant material" will be understood to mean any element or compound which normally reacts with free organic radicals under normal reaction conditions. Representative reactant materials, subject to the boiling point limitation, include hydrogen; the halogens such as chlorine, bromine, and fluorine; the hydrogen halides such as hydrogen fluoride, hydrogen chloride, hydrogen bromide, and hydrogen iodide; and unsaturated compounds such as the olefins and the acetylenic compounds which may contain halogen atoms, e.g. ethylene, propylene, the butenes, the butadienes, tetrafluoroethylene, vinyl fluoride, vinyl bromide, vinyl chloride, vinyl iodide, difluoroethylene, trifluoroethylene, 1-butyne, and the like. Representative reactions, which have been carried out in this manner, are shown by the following equations:

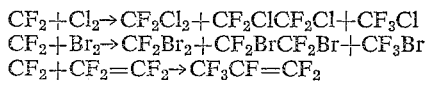

The products of such reactions are well known and useful compounds. The compounds $CF_2Cl_2$, $CF_2ClCF_2Cl$, $CF_3Cl$, $CF_2Br_2$, and $CF_2BrCF_2Br$ are commercial products used as refrigerants, propellants, fire extinguishing agents, and the like. Hexafluoropropylene is a commercially valuable intermediate for preparing perfluorinated polymers and other products.

A form of apparatus, suitable for use in the practice of this invention, is shown diagrammatically in the accompanying drawing. The apparatus comprises a tubular jacket or envelope 2 surrounding a tubular cold-finger 4 containing a liquid refrigerant such as liquid nitrogen. The jacket 2 is provided, near the lower end of the cold-finger, with an inlet side arm 6 equipped with a valve 8. The jacket 2 is also provided with an outlet side arm 10, positioned on the opposite side of the jacket from the inlet side arm 6 and higher on the jacket, equipped with a valve 12 and connected to a conventional source of high vacuum (not shown). The side arm 6 is connected, by line 14, to a vacuum gauge 16, and to a container 18 for starting materials through valves 20, and to a container 22 for reactants through valves 24. The reactor, comprising the jacket 2, cold-finger 4 and side arms 6 and 10, is gas tight to exclude air and other undesired or contaminating substances. A wire 26, which is a conductor of electricity, passes through a seal 28 in the jacket 2 and has its inner end portion 26a positioned near the wall of the cold-finger and between the cold-finger and the end of the side arm 6. The wire 26 will be grounded at its outer end to any convenient earth ground. A source 30 of radio frequency electric power, such as an air-core Tesla coil, is coupled to a means 32 for applying a radio frequency electric discharge to a lower portion of the outer surface of the reactor near the portion 26a of the wire 26.

The reactor assembly, including the jacket 2 and the arms 6 and 10, may be surrounded by an open-ended cylinder 34 of polyethylene or the like through which warm air may be passed, particularly when the atmosphere is humid, to prevent condensation of water on the outer surface of the reactor. Such water condensation tends to markedly lower the efficiency of the apparatus. Alternatively, the reactor assembly may be enclosed in a sealed container to prevent contact of the atmosphere therewith.

The cold-finger 4, the jacket 2, and the arms 6 and 10 are constructed of materials which are non-conductors of electricity and which are transparent to radio frequency electric discharges. They may be made of glass, quartz, glazed porcelain, glazed alumina, and the like. Preferably, they are made of glass and particularly of glass which will withstand large temperature variations, such as Pyrex glass. As shown and as used in the examples given hereinafter, the cold-finger 4 conveniently had an outside diameter of 2.5 cm. and the jacket 2 had a length of 16 cm. and an inside diameter of 5.5 cm., whereby the inner surface of the jacket was spaced 1.5 cm. from the surface of the cold-finger. With a cold-finger of the size shown, the inside diameter of the jacket 2 can be considerably larger, but should not be materially smaller as the higher surface to volume ratio resulting from closer spacing of the opposing surfaces tends to cause recombination of the radicals before they can be trapped.

The cold-finger or condensing surface must be maintained at a temperature below 95° K., and this may be accomplished by any means known to the art. Most conveniently, such temperature is obtained by maintaining in the cold-finger a suitable liquefied gas refrigerant. Representative liquefied gas refrigerants and their boiling points are: liquid nitrogen, 77° K. (−195.8° C.); liquid hydrogen, 14° K. (−259° C.); liquid helium, 4.3° K (−269° C.); liquid fluorine, 85° K. (−188° C.); liquid oxygen, 90° K. (−183° C.); liquid argon, 84° K. (−189.2° C.); liquid neon, 24.5° K. (−248.7° C.) and liquid air which gives a temperature between 77° K. and 90° K., but does not remain constant. Liquid nitrogen is much preferred because the others have one or more disadvantages of being difficult to obtain, being very expensive, or presenting very serious fire, corrosion, or toxic hazards.

The ground wire 26 preferably is made of tungsten, copper, or platinum, each of which has been used successfully, and may be made of silver, steel, or aluminum if desired. Gold wire is not suitable. The portion 26a of the ground wire should be positioned near the condensing surface of the cold-finger, i.e. near where the trapped radicals are to be deposited, so as to cause the electric discharge to be concentrated in a zone at or near the condensing surface. In the absence of the ground wire, the radio frequency electric discharge spreads throughout the reactor, resulting in poor efficiency of operation. Ordinarily, the ground wire is spaced about 0.5 to about 1 cm. from the condensing surface. Two or more of such ground wires may be used to increase the concentration of the radio frequency electric discharge or to increase the number or size of the deposits.

The radio frequency electric discharge is passed through the reactor near the condensing surface and near the portion 26a of the ground wire 26. The position of the radio frequency electric discharge source 32 shown in the drawing is a preferred approximate position and not a fixed point and such position may be varied to some extent at will. Any convenient source of radio frequency electric power may be used. A very convenient source is an air-core Tesla coil. Other suitable sources are diathermy units and the like. The methods of coupling the radio frequency power source and applying the electric discharge therefrom to the reactor are well known; several recently used methods being described in the book on "Formation and Trapping of Free Radicals," by A. M. Bass and H. P. Broida, Academic Press, N.Y., 1960, see particularly pages 53 and 54.

In operation, the reactor is evacuated with a mercury diffusion pump to from about $10^{-5}$ to about $10^{-6}$ mm. Hg to remove adsorbed moisture. The wire 26 is grounded. A radio frequency electric discharge is applied to the outer surface of the jacket 2 in the approximate position shown on the drawing, and passes through the reactor, being concentrated near the surface of the cold-finger in the vicinity of the portion 26a of the ground wire 26. Then perflorocyclobutane (or a mixture thereof with other matrix forming gases) is fed from tank 18 at a moderate rate into the reactor for up to about 15 minutes, and passes through the zone of concentrated radio frequency electric discharge and then into contact with the condensing surface of the cold-finger. Some of the perfluorocyclobutane is decomposed by the radio frequency electric discharge to form difluoromethylene radicals. Unreacted perfluorocyclobutane (and any other matrix forming gas) freezes out on the cold-finger and, simultaneously therewith, the difluoromethylene radicals collect in the frozen perfluorocyclobutane, forming a blue deposite 36. When sufficient material has collected, the feed of perfluorocyclobutane is stopped and the radio frequency electric discharge is discontinued.

When it is desired to react the free difluoromethylene radical with other reactant materials, the deposit 36 will be maintained at below 95° K. and an excess of the other reactant material will be introduced from tank 22. The refrigerant is removed from the cold-finger and the temperature allowed to rise. When the temperature reaches 95° K., the color of the deposit rapidly fades and the reaction between the free radical and the other reactant takes place.

The resulting reaction products may be recovered in any conventional manner. The temperature in the reactor or of the cold-finger may be raised to melt the products, whereby they can be poured from the reactor, or to distill off the reaction products. They may also be removed by washing with a suitable solvent. If any of the products cannot be readily recovered by such means, they can be scraped off of the cold-finger.

The reactor may be operated at any pressure up to about 1 atmosphere, but it is preferred to employ pressures in the range of from about 0.1 to about 10 mm. of mercury. The perfluorocyclobutane, the mixtures thereof with other matrix forming materials, and the reactant materials for reaction with the difluoromethylene radicals ordinarily will be fed to the reactor at about atmospheric pressure, the lower pressures in the reactor being obtained and maintained by control of the rate of feed of such gaseous materials and the application of a vacuum to the outlet side arm 10 of the reactor.

The gaseous materials ordinarily will be fed to the reactor at the ambient temperature, i.e. at about room temperature. They may be fed at higher or lower temperatures, if desired, but must be fed at temperatures above their boiling points at the pressure employed. For example, bromine would have to be heated to above its boiling point, about 59° C., if the system pressure is near atmospheric pressure. However, under the preferred pressure of 10 mm. of mercury or less, bromine is gaseous at normal room temperatures and heating thereof is not then required. Under the preferred conditions employing the feed gases at about room temperatures, the temperatures at all points throughout the reactor, except the cold-finger or condensing surface, will be at about room temperature and hence above the boiling points of the feed gases, so that such gases will not condense in the reactor other than on the cold-finger or condensing surface.

In order to more clearly illustrate this invention, preferred modes of carrying it into effect, and the advantageous results to be obtained thereby, the following examples are given in which the parts and proportions are by weight except where specifically indicated otherwise.

*Example 1*

The apparatus employed was that shown in the drawings and more particularly described hereinbefore. Liquid nitrogen was used as the refrigerant in the cold-finger. The reactor was evacuated with a mercury diffusion pump to a pressure of from $10^{-5}$ to $10^{-6}$ mm. of mercury to remove the adsorbed moisture. Wire 26 was grounded and the radio frequency electric discharge from an air-core Tesla coil was applied to the outer surface of the outer jacket 2. Then perfluorocyclobutane was fed to the reactor at room temperature and at a rate of from about 4 to about 14 volumes per reactor volume per hour for about 10 to about 15 minutes, resulting in a blue deposit 36 consisting essentially of difluoromethylene radicals trapped in solidified perfluorocyclobutane. When the deposit was allowed to warm up, the blue color faded rapidly when the temperature reached 95° K. Analysis of the resulting product showed it to consist entirely of tetrafluoroethylene and perfluorocyclobutane. The identity of the difluoromethylene radical was established by its conversion to tetrafluoroethylene on warming and by the products of its reactions with chlorine and bromine.

*Example 2*

The apparatus and process of Example 1 was repeated to the formation of the blue deposit. Then an excess of chlorine was admitted to the reaction system and condensed over the blue deposit. The liquid nitrogen was then removed from the cold-finger. When the temperature reached 95° F., the blue color in the deposit rapidly faded. Analysis of the product indicated a 56.1% radical yield of $CR_2Cl_2$, a 26.8% radical yield of $CF_2ClCF_2Cl$, and a 17.1% radical yield of $CF_3Cl$.

*Example 3*

Example 2 was repeated, substituting bromine for the chlorine. Similar results were obtained giving $CF_2Br_2$, $CF_2BrCF_2Br$, and $CF_3Br$.

*Example 4*

The procedure of Example 2 was repeated, substituting tetrafluoroethylene for the chlorine. The product of the reaction was hexafluoropropylene.

The total concentration of the difluoromethylene radicals in the matrix in the preceding examples varied from about 1% to about 5% by weight, based on the total chlorinated or brominated products obtained in Examples 2 and 3.

It will be understood that the preceding examples have been given for illustrative purposes solely and that this invention is not restricted to the specific embodiments described therein. On the other hand, it will be apparent to those skilled in the art that, subject to the limitations set forth in the general description, many variations can be made in the materials, conditions and techniques employed without departing from the spirit or scope of this invention. From the preceding description and examples, it will be apparent that this invention provides a novel process for preparing trapped difluoromethylene radicals in a stable and useful form. The compositions, of the difluoromethylene radicals trapped in the solid matrix, are novel and useful compositions which are valuable for making tetrafluoroethylene and a variety of other useful products. Also, this invention provides a novel process for isolating difluoromethylene radicals and reacting them with desired reactant materials to produce a wide variety of valuable and useful fluorine-containing compounds, i.e., this invention provides a novel process for making such fluorine-containing compounds. Therefore, it will be apparent that this invention constitutes a valuable advance in and contribution to the art.

The embodiments of the invention in which an exclusive property or privilege is claimed are defined as follows:

1. A composition consisting essentially of difluoromethylene radicals trapped at a temperature below 95° K. in a solid matrix of the group consisting of perfluorocyclobutane and mixtures of perfluorocyclobutane and an inert material having a melting point above 95° K. and a boiling point below 21° C. at 10 mm. of mercury.

2. A composition consisting essentially of difluoromethylene radicals trapped at a temperature below 95° K. in a solid matrix of perfluorocyclobutane.

(References on following page)

References Cited by the Examiner

UNITED STATES PATENTS

| | | | |
|---|---|---|---|
| 2,384,821 | 9/45 | Downing et al. | 260—648 |
| 2,575,807 | 11/51 | Griesinger | 252—182 |
| 2,672,438 | 3/54 | Hertog et al. | 204—169 |
| 2,676,145 | 4/54 | Weisz et al. | 204—169 |
| 2,892,766 | 6/59 | Broida et al. | 204—164 |
| 2,924,562 | 2/60 | Golden | 204—164 |
| 2,988,513 | 6/61 | Brown | 252—182 |
| 3,062,730 | 11/62 | Ruehrwein | 204—176 |
| 3,081,245 | 3/63 | Farlow | 204—169 |

OTHER REFERENCES

"Fluorocarbon Derivatives," Haszeldine, No. 1, 1956, pages 9–11.

"Nucleonics," vol. 11, No. 10, October 1953, page 20.

ALBERT T. MEYERS, *Primary Examiner*.

JOHN R. SPECK, *Examiner*.